United States Patent
Figner et al.

(10) Patent No.: US 12,208,464 B2
(45) Date of Patent: Jan. 28, 2025

(54) FRICTION STIR WELDING TOOL AND FRICTION STIR WELDING METHOD

(71) Applicant: Stirtec GmbH, Premstätten (AT)

(72) Inventors: Gunter Figner, Graz (AT); Ozan Caliskanoglu, Graz (AT); Lucas Oppeneiger, Graz (AT); Christian Pfeiffer, Graz (AT); Thomas Weinberger, Graz (AT)

(73) Assignee: Stirtec GmbH, Premstätten (AT)

( * ) Notice: Subject to any disclaimer, the term of this patent is extended or adjusted under 35 U.S.C. 154(b) by 48 days.

(21) Appl. No.: 18/272,270

(22) PCT Filed: Nov. 4, 2021

(86) PCT No.: PCT/AT2021/060403
§ 371 (c)(1),
(2) Date: Jul. 13, 2023

(87) PCT Pub. No.: WO2022/159992
PCT Pub. Date: Aug. 4, 2022

(65) Prior Publication Data
US 2024/0066623 A1    Feb. 29, 2024

(30) Foreign Application Priority Data
Jan. 27, 2021   (AT) .............. A 50045/2021

(51) Int. Cl.
*B23K 20/12* (2006.01)
(52) U.S. Cl.
CPC .......... *B23K 20/125* (2013.01); *B23K 20/123* (2013.01)
(58) Field of Classification Search
CPC .................. B23K 20/122–128; F16H 1/28
(Continued)

(56) References Cited

U.S. PATENT DOCUMENTS 6,050,475 A  *  4/2000  Kinton ............... B23K 20/121
                                                                228/2.1
6,259,052 B1 *  7/2001  Ding ................... B23K 20/125
                                                                219/125.11
(Continued)

FOREIGN PATENT DOCUMENTS

CN    104475965 A  *  4/2015
CN    104640649 A  *  5/2015  ............ B21J 15/027
(Continued)

OTHER PUBLICATIONS

International Search Report issued in International Patent Application No. PCT/AT2021/060403, dated Feb. 9, 2022, along with an English translation thereof.
(Continued)

*Primary Examiner* — Kiley S Stoner
(74) *Attorney, Agent, or Firm* — GREENBLUM & BERNSTEIN, P.L.C.

(57) ABSTRACT

A friction stir welding tool for a machine tool having a frame and a spindle rotatable relative to the frame. The friction stir welding tool includes a pin, a shoulder, and a drive shaft connectable to the spindle to set the pin and shoulder in rotational motion about a rotation axis, wherein the shoulder is rotatable relative to the pin about the rotation axis. To obtain different speeds of the pin and shoulder in a simple and robust manner, a planetary transmission having a ring gear, a planet carrier, and a sun gear is connected to the drive shaft, pin, and shoulder. The pin or the shoulder is connected to the planet carrier so that the pin and shoulder are set in rotation about the rotation axis at different rotational speeds, but in the same rotation direction, by driving the drive shaft by the spindle.

14 Claims, 1 Drawing Sheet

(58) Field of Classification Search
USPC .............................................. 228/112.1, 2.1
See application file for complete search history.

(56) References Cited

U.S. PATENT DOCUMENTS

| | | | |
|---|---|---|---|
| 6,264,088 B1 | 7/2001 | Larsson | |
| 2006/0102699 A1* | 5/2006 | Burton | B23K 20/123 228/2.1 |
| 2006/0163316 A1* | 7/2006 | Burton | B23K 20/125 228/2.1 |
| 2006/0273140 A1 | 12/2006 | Ghosh | |
| 2008/0083817 A1* | 4/2008 | Baumann | B23K 20/123 228/102 |
| 2021/0121977 A1* | 4/2021 | Rosal | B23K 20/1255 |
| 2023/0249279 A1* | 8/2023 | Sevestre | B23K 20/122 228/112.1 |

FOREIGN PATENT DOCUMENTS

| | | | | |
|---|---|---|---|---|
| CN | 110014220 A | * | 7/2019 | ......... B23K 20/1245 |
| CN | 111168223 A | * | 5/2020 | ............. B23K 20/12 |
| CN | 111408832 A | * | 7/2020 | ........... B23K 20/126 |
| CN | 112317951 A | * | 2/2021 | |
| CN | 113798656 A | * | 12/2021 | |
| EP | 3385025 A1 | * | 10/2018 | |
| FR | 3046096 A1 | * | 6/2017 | |
| KR | 101313005 B1 | * | 10/2013 | |
| WO | 98/51441 | | 11/1998 | |
| WO | 2006/116288 | | 11/2006 | |
| WO | WO-2007024681 A1 | * | 3/2007 | ........... B23K 20/125 |
| WO | WO-2010074165 A1 | * | 7/2010 | ......... B23K 20/1255 |
| WO | WO-2016124168 A1 | * | 8/2016 | ........... B23K 20/123 |
| WO | WO-2019178138 A2 | * | 9/2019 | ............. B22F 10/25 |

OTHER PUBLICATIONS

Written Opinion of the International Searching Authority issued in International Patent Application No. PCT/AT2021/060403, dated Feb. 9, 2022.

* cited by examiner

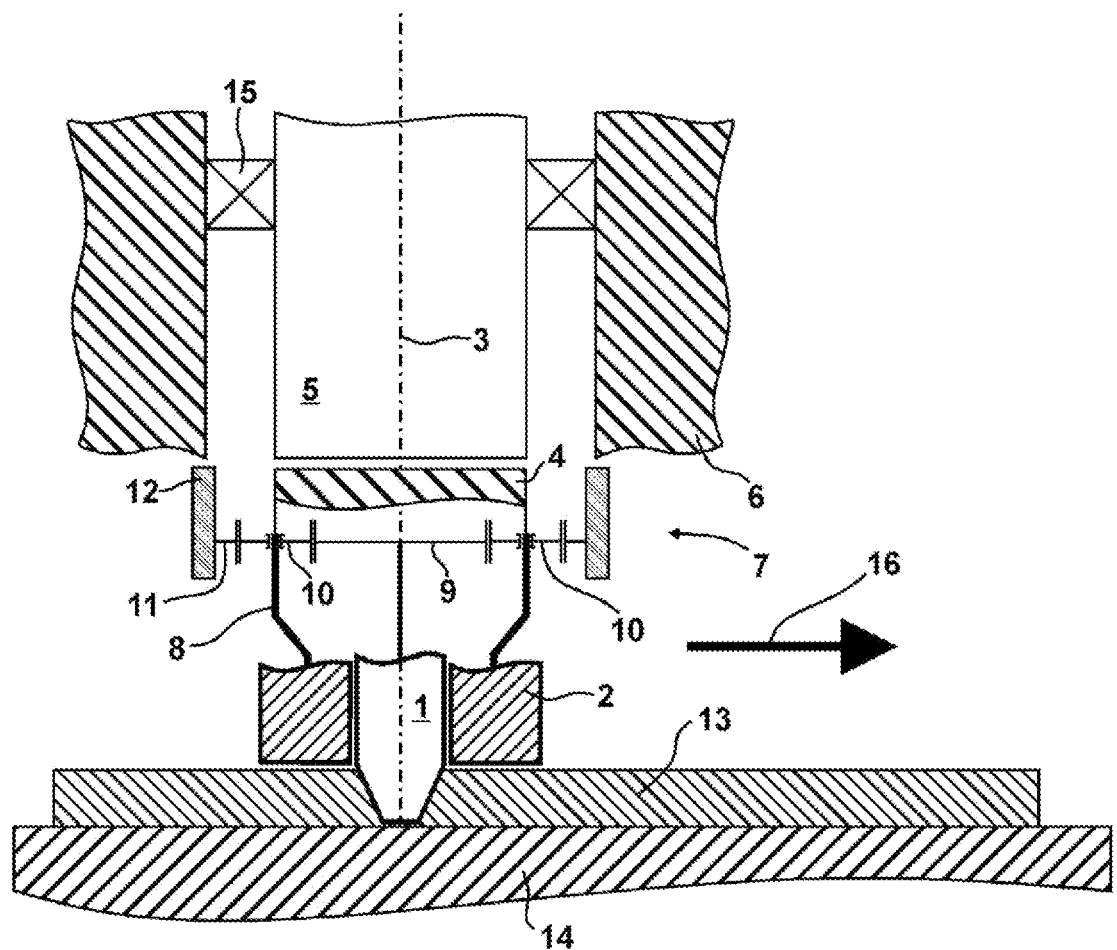

FRICTION STIR WELDING TOOL AND FRICTION STIR WELDING METHOD

The invention relates to a friction stir welding tool for a machine tool which has a frame and a spindle that can be rotated relative to the frame, wherein the friction stir welding tool comprises a pin and a shoulder, as well as a drive shaft which can be connected to the spindle of the machine tool, in order to set the pin and the shoulder in a rotational motion about a rotation axis via the spindle, wherein the shoulder can be rotated relative to the pin about the rotation axis.

In addition, the invention relates to a friction stir welding method, wherein a friction stir welding tool having a drive shaft, a pin, and a shoulder is set in a rotational motion about a rotation axis using a spindle of a machine tool.

Friction stir welding tools and methods of the type named at the outset have become known from the prior art. A corresponding friction stir welding tool typically comprises a pin and a shoulder arranged perpendicularly to the pin, which shoulder has a larger diameter than the pin, in order to connect adjacent component parts by mixing material in a joining zone around the friction stir welding tool. To obtain a good stirring in a region of the pin, a high rotational speed of the friction stir welding tool in the region of the pin is advantageous.

In the case of friction stir welding tools which comprise a pin that is rigidly connected to the shoulder, however, correspondingly high rotational speeds lead to unfavorably high speeds in the region of the shoulder, which have negative effects on a quality of the weld. In order to avoid this problem, friction stir welding tools are known from the prior art in which the shoulder is separated from the pin and has a different speed than the pin, wherein separate drives are proposed for the pin on the one hand and the shoulder on the other hand. However, this results in friction stir welding tools that are costly to produce, and which are difficult to handle at best.

This is addressed by the invention. The object of the invention is to specify a friction stir welding tool of the type named at the outset which can be produced in a constructively simple manner and is simultaneously robust.

Furthermore, a friction stir welding method of the type named at the outset is to be specified which can be implemented in a constructively simple manner and is simultaneously robust during application.

According to the invention, the first object is attained by a friction stir welding tool of the type named at the outset in which a planetary transmission having a ring gear, a planet carrier, and a sun gear is provided, which planetary transmission is connected to a drive shaft, pin, and shoulder, wherein the pin or the shoulder is connected to the planet carrier so that the pin and shoulder can be set in rotation about the rotation axis at different rotational speeds, but in the same rotation direction, by driving the drive shaft by means of the spindle.

In the course of the invention, it was found that a simple and simultaneously robust construction is achieved through a corresponding use of a planetary transmission in a friction stir welding tool. Thus, on the one hand a single drive that acts on the planetary transmission is sufficient to obtain different speeds for the pin and shoulder. Due to the identical rotation direction along which the pin and shoulder rotate about the rotation axis at different speeds, a low wear on a contact surface between the pin and shoulder is achieved, especially since a relative speed between the pin and shoulder is thus lower, for example, than in the case of a tool on which the pin and shoulder rotate in different directions.

A friction stir welding tool of this type can be obtained in the most diverse manners with a planetary transmission. For example, it can be provided that the spindle is connected in a rotationally fixed manner to the sun gear, the planet carrier, or the ring gear of the planetary transmission.

Typically, either the sun gear or the ring gear is held stationary, or either the sun gear or the ring gear can be connected to the frame such that said gear is rotationally fixed about the rotation axis. By respectively connecting the planet carrier to the pin or the shoulder, it is easily possible to ensure an identical rotation direction of the pin and shoulder.

If the sun gear is connected to the drive shaft in a rotationally fixed manner so that the spindle drives the sun gear, the ring gear can typically be connected to the frame in a rotationally fixed manner, and the pin and shoulder are then connected to the sun gear and planet carrier or, alternatively, to the planet carrier and the sun gear. In this case, the output thus takes place via the sun gear and planet carrier, which drive the pin and the shoulder at different speeds, but in the same rotation direction. A corresponding output via the sun gear and planet carrier can, of course, also be achieved if the ring gear can be connected to the frame in a rotationally fixed manner, or does not rotate about the rotation axis, and the drive takes place via the planet carrier.

If the ring gear is connected to the drive shaft in a rotationally fixed manner so that the spindle drives the ring gear, the sun gear can typically be connected to the frame in a rotationally fixed manner, and the pin and shoulder are then connected to the ring gear and planet carrier or, alternatively, the pin and shoulder are connected to the planet carrier and ring gear. In this case, the output thus takes place via the ring gear and planet carrier. A corresponding output via the ring gear and planet carrier can, of course, also be achieved if the sun gear can be connected to the frame in a rotationally fixed manner, or does not rotate about the rotation axis, and the drive takes place via the planet carrier.

Regardless of which of the planetary transmission, sun gear, ring gear, and planet carrier components are driven or are connected to the drive shaft in a rotationally fixed manner, an output thus respectively takes place with the involvement of the planet carrier, or the planet carrier is always connected to the shoulder or the pin and is never rigidly connected to the frame, in order to ensure a rotation of the pin and shoulder in the same direction.

Preferably, it is provided that the drive shaft is connected to the planet carrier or the sun gear of the planetary transmission, and that the shoulder is connected to the planet carrier and the pin to the sun gear of the planetary transmission, wherein a ring gear of the planetary transmission is connected to a supporting device, via which supporting device the ring gear can be connected to the frame of the machine tool such that it is rotationally fixed about the rotation axis. Alternatively, in a design of this type, in which the ring gear is connected to the frame of the machine tool in a rotationally fixed manner, or can be attached to the frame in a rotationally fixed manner, and the drive takes place via the planet carrier or the sun gear, the pin can, of course, also be connected to the planet carrier and the shoulder to the sun gear, for example with the use of a hollow shaft.

Through this embodiment, a simple and simultaneously robust construction is achieved, by means of which different rotational speeds of the pin and shaft can be obtained. Because the ring gear, in which the planet carrier can be rotated about the rotation axis of the sun gear via planet gears, can in this case be connected to the frame in a rotationally fixed manner via the supporting device, which can also be part of the ring gear, a stable mounting of the planet carrier, and thus of the shoulder of the friction stir welding tool, which shoulder is typically connected to the planet carrier in a rotationally fixed manner, can be achieved. The sun gear is, in turn, likewise mounted in the ring gear via the planets, as is typical in planetary transmissions, so that the pin and shoulder can be rotated about the rotation axis and relative to one another, yet at the same time can be mounted in a stable and robust manner relative to the frame via the ring gear.

Normally, the pin is connected to the sun gear in a rotationally fixed manner and the shoulder is connected to the planet carrier in a rotationally fixed manner. The drive shaft can be connected to the planet carrier or to the sun gear of the planetary transmission, typically such that it is rotationally fixed about the rotation axis, in order to transmit a torque from the spindle to the friction stir welding tool via the planet carrier or the sun gear. Preferably, the drive shaft is connected to the planet carrier such that it is rotationally fixed about the rotation axis. The shoulder, drive shaft, and planet carrier can then be formed by separate and connected components, or also by a single component.

In an alternative embodiment, it can be provided that the drive shaft is connected to the ring gear or the planet carrier, and that the shoulder is connected to the ring gear and the pin to the planet carrier of the planetary transmission, wherein the sun gear of the planetary transmission is connected to a supporting device, via which supporting device the sun gear can be connected to the frame of the machine tool such that it is rotationally fixed about the rotation axis.

Thus, in this embodiment, in which the sun gear is connected to the frame in a rotationally fixed manner, different rotational speeds of the pin and shoulder are also realized in a constructively simple manner, wherein the pin and shoulder also rotate in the same direction here if a drive takes place via the drive shaft that is connected to the ring gear or planet carrier in this case.

Through an appropriate choice of the numbers of teeth of the ring gear, planet gears, and sun gear, any desired transmission ratios of the rotational speed of the shoulder to the rotational speed of the pin can be achieved, wherein the shoulder is preferably connected in a rotationally fixed manner to the spindle of a corresponding machine tool via the planet carrier and the drive shaft.

It is preferably provided that the numbers of teeth of the ring gear, sun gear, and one or more planet gears are chosen such that a rotational speed of the pin is greater than a rotational speed of the shoulder. If the drive takes place via the planet carrier, a rotational speed of the pin, which is normally identical to a rotational speed of the sun gear, is thus higher than the rotational speed of the spindle.

Typically, at least three planet gears are provided, in order to achieve a uniform introduction of a torque into the sun gear and a correspondingly uniform support of the shoulder and pin relative to the frame.

If the numbers of teeth of the ring gear, sun gear, and the planet gears are chosen such that a rotational speed of the pin is greater than a rotational speed of the shoulder, a particularly good stirring of material of the individual component parts in the region of the pin can simultaneously be achieved, wherein a disadvantageously high speed of the shoulder relative to the component parts which are to be welded is nevertheless avoided. As a result, a high-quality weld can be obtained, in particular even in the case of thick-walled component parts.

It is beneficial if a force measuring device is provided between the pin and drive shaft, in order to determine an axial and/or radial force on the pin and/or the shoulder during a friction stir welding operation. The friction stir welding method can then be controlled as a function of occurring forces, in particular such that a breakage of the friction stir welding tool can be reliably avoided even in the case of a high feed rate.

On a machine tool having a frame and a spindle that can be rotated relative to the frame, with a friction stir welding tool being connected to the spindle, it is beneficial if the friction stir welding tool is embodied according to the invention. A friction stir welding method in which a rotational speed at the pin is higher than at the shoulder can then be implemented, wherein a constructively simple and simultaneously robust implementation is ensured.

On a machine tool of this type, it is preferably provided that the ring gear or the sun gear is connected to the frame by means of a supporting device such that said gear is rotationally fixed about the rotation axis. For this purpose, the supporting device can be connected to the frame in a form-fitting and/or force-fitting manner, for example. The supporting device, in turn, can be connected to the ring gear or the sun gear in a force-fitting, form-fitting, and/or materially bonded manner, or can also be embodied in one piece with the ring gear or the sun gear, for example as a lug via which a rotationally fixed and preferably releasable connection can be produced between the frame and ring gear or between the frame and sun gear. A speed of the planet carrier and of the sun gear or, if the sun gear is connected to the frame in a rotationally fixed manner, a speed of the planet carrier and of the ring gear, is then clearly defined based on a speed of the spindle about a spindle axis, wherein the spindle axis can coincide with the rotation axis of the friction stir welding tool.

Thus, by altering the speed of the spindle, the speeds of the pin and shoulder can be changed in a simple manner. A transmission ratio of the speed of the pin to the speed of the shoulder is typically greater than 1.0 and constant if the ring gear or the sun gear is fixed relative to the frame in terms of a rotation about the rotation axis. The pin and shoulder thus rotate in the same direction about the rotation axis, but at different speeds.

It shall be understood that the frame itself, relative to which the spindle and the friction stir welding tool can be rotated and with which the ring gear or the sun gear is typically connected in a rotationally fixed manner, does not need to be stationary, but rather can be moved along a feed direction relative to a machine table, for example, in order to weld component parts to one another without moving the component parts themselves.

Furthermore, it can be beneficial if a force measuring device is provided at the spindle, in order to determine a radial and/or axial force acting on the spindle. A corresponding friction stir welding method can then be controlled based on the force measured at the spindle, if necessary after a conversion to a force acting on the friction stir welding tool, such that a maximum feed rate is achieved without exceeding maximally permissible mechanical loads on the friction stir welding tool.

It is preferably provided that the frame together with the spindle can be moved by means of a feed drive along a feed direction relative to a machine table and/or relative to component parts being welded. The frame can thus also be embodied by a component that can be moved relative to the machine table, in which component the spindle is mounted such that it can be rotated about the spindle axis.

The other object is attained according to the invention by a friction stir welding method of the type named at the outset in which a motion of the spindle is transferred to the drive shaft, wherein a drive power supplied via the drive shaft is distributed to the pin and shoulder via a planetary transmission that connects the drive shaft, pin, and shoulder, wherein the pin and shoulder rotate about the rotation axis in the same direction. Through the distribution of the drive power to the pin and shoulder by means of the planetary transmission, a simple and simultaneously robust construction is achieved in which the pin and shoulder rotate at different speeds and a rotation of the pin and shoulder in the same direction is nevertheless ensured. Preferably, a friction stir welding tool according to the invention is used in a method of this type.

It has proven effective that the drive shaft is connected to a planet carrier or a sun gear of the planetary transmission, wherein the sun gear of the planetary transmission is connected to the pin and wherein the planet carrier is connected to the shoulder of the friction stir welding tool. Of course, the sun gear can alternatively also be connected to the shoulder and the planet carrier to the pin. In such an embodiment of the invention, the ring gear is typically held stationary, or the ring gear does not rotate relative to a frame of a machine tool with which the method is implemented, and also not relative to component parts being welded; rather, only the planet carrier and sun gear rotate about the rotation axis.

Alternatively, it can be provided that the drive shaft is connected to a planet carrier or to a ring gear of the planetary transmission, wherein the planet carrier of the planetary transmission is connected to the pin and wherein the ring gear is connected to the shoulder of the friction stir welding tool. Furthermore, in an embodiment of this type, in which the drive takes place via the planet carrier or the ring gear, it can also be provided that the planet carrier is connected to the shoulder and the ring gear to the pin, in order to obtain different speeds of the pin and shoulder.

In such an embodiment of the invention, the sun gear is typically held stationary, or the sun gear does not rotate relative to a frame of a machine tool with which the method is implemented, and the sun gear accordingly does not rotate relative to component parts being welded; rather, only the planet carrier and ring gear rotate about the rotation axis in this case.

Due to the use of a transmission between the pin and shoulder, a rotational speed of the pin can differ from a rotational speed of the shoulder, in particular in order to obtain a high rotational speed of the pin with simultaneously permissible relative speeds between the shoulder and the component parts being connected.

Preferably, it is provided that a rotational speed of the pin about the rotation axis is higher than a rotational speed of the shoulder about the rotation axis.

It has proven effective that an axial and/or radial force is measured at the spindle and/or at the friction stir welding tool. A correspondingly measured force can in particular be used to control the friction stir welding method, in order to ensure a maximum possible feed rate without damaging the friction stir welding tool.

Additional features, advantages, and effects of the invention follow from the exemplary embodiment described below. In the drawing which is thereby referenced:

FIG. 1 shows a friction stir welding tool according to the invention in schematic illustration.

FIG. 1 shows a friction stir welding tool according to the invention, together with a portion of a machine tool and component parts 13 being connected, in a schematic sectional illustration. As can be seen, the friction stir welding tool comprises a pin 1 and a shoulder 2, as well as a drive shaft 4, which are arranged in a frame 6 of the machine tool such that they can be rotated about a rotation axis 3 and which can be driven by a spindle 5 of the machine tool. The spindle 5 is, in turn, connected to the frame 6 by bearings 15 such that it can be rotated about a spindle axis, wherein the spindle axis in this case coincides with the rotation axis 3 of the friction stir welding tool.

The spindle 5 of the machine tool is typically connected to the drive shaft 4 of the friction stir welding tool in a rotationally fixed and typically releasable manner, which drive shaft 4 is, in the exemplary embodiment illustrated, in turn connected to the shoulder 2 of the friction stir welding tool in a rotationally fixed manner. Alternatively, the drive shaft 4 could also be connected to the pin 1 in a rotationally fixed manner.

In order to obtain different speeds of the pin 1 and shoulder 2, the friction stir welding tool comprises a planetary transmission 7, wherein the shoulder 2 and, in the example illustrated, also the drive shaft 4 are connected in a rotationally fixed manner to a planet carrier 8 of said planetary transmission 7. The planet carrier 8 is, as is typical for planetary transmissions 7 or epicyclic transmissions, connected to a ring gear 11 via planet gears 10 rotatably connected to the planet carrier 8, wherein the planet gears 10 engage with the ring gear 11 on the one hand and with a sun gear 9 of the planetary transmission 7 on the other hand. Accordingly, the sun gear 9 and planet carrier 8 rotate about the same rotation axis 3, whereas the planet gears 10 rotate about rotation axes 3 which circulate in the ring gear 11 with the planet carrier 8.

The ring gear 11 of this planetary transmission 7 is, according to a first embodiment of the invention, connected to the frame 6 of the machine tool in a rotationally fixed manner, namely via a supporting device 12 which, for example, can be embodied for force-fitting and/or form-fitting connection to the frame 6. The sun gear 9 of the planetary transmission 7 is in this case connected in a rotationally fixed manner to the pin 1 of the friction stir welding tool so that the shoulder 2 of the friction stir welding tool has a rotational speed corresponding to the planet carrier 8 and the pin 1 has a rotational speed corresponding to the sun gear 9.

As a result of this arrangement, a rotational speed difference between the pin 1 and shoulder 2 is obtained, wherein a speed increasing ratio is preferably realized between the shoulder 2 and pin 1 so that a rotational speed of the pin 1 about the rotation axis 3 is thus typically higher than a rotational speed of the shoulder 2 about the rotation axis 3. In the exemplary embodiment illustrated, the pin 1 and shoulder 2 rotate in the same direction. Because the ring gear 11 is connected to the frame 6 in a rotationally fixed manner in the exemplary embodiment, a speed of the planet carrier 8, and therefore a speed of the shoulder 2, and a speed of the sun gear 9, and therefore a speed of the pin 1, are clearly defined by the numbers of teeth of the ring gear 11, the planet gears 10, and the sun gear 9.

As schematically depicted, the frame 6, together with the spindle 5 and the friction stir welding tool, can be moved along a feed direction 16 relative to a machine table 14 to which component parts 13 being welded can be rigidly connected, in order to connect the component parts 13 to one another by means of a weld extending along the feed direction 16.

Although in the exemplary embodiment illustrated the ring gear 11 is connected to the frame 6 in a rotationally fixed manner and the drive takes place via the planet carrier 8, other embodiments of the invention are, of course, also possible in which not the ring gear 11, but rather the sun gear 9 is connected to the frame 6 in a rotationally fixed manner, and in which the drive takes place via the ring gear 11 or the planet carrier 8.

Furthermore, it shall be understood that each of the planetary transmission 7, planet carrier 8, sun gear 9, and ring gear 11 components that is not connected to the frame 6 in a rotationally fixed manner can be connected either to the pin 1 or to the shoulder 2 in order to obtain different speeds of the pin 1 and shoulder 2 and, at the same time, a rotation of the pin 1 and shoulder 2 in the same direction.

Consequently, there are four exemplary embodiments of the invention each in which the ring gear 11 is connected to the frame 6 in a rotationally fixed manner. A first embodiment corresponds to the embodiment illustrated in FIG. 1, in which the shoulder 2 is connected to the planet carrier 8 and the pin 1 to the sun gear 9 in a rotationally fixed manner, and the drive takes place via the planet carrier 8, or the planet carrier 8 is connected to the drive shaft 4 in a rotationally fixed manner.

According to a second embodiment not depicted, the pin 1 can, in contrast to the first embodiment, be connected to the planet carrier 8 and the shoulder 2 to the sun gear 9 in a rotationally fixed manner. A connection of the plant carrier 8 to the pin 1 can, for example, occur through a hollow shaft of the sun gear 9.

A third embodiment, also not depicted, corresponds to the first embodiment in terms of the coupling of the pin 1 and shoulder 2 with the planetary transmission 7, though the drive shaft 4 is not coupled with the planet carrier 8, but rather with the sun gear 9.

Analogously, according to a fourth embodiment, likewise not depicted, the drive shaft 4 can also be coupled with the sun gear 9, wherein the fourth embodiment corresponds to the second embodiment in terms of the coupling of the pin 1 and shoulder 2 with the planetary transmission 7, so that in this case, too, the pin 1 is connected to the planet carrier 8 and the shoulder 2 to the sun gear 9 in a rotationally fixed manner.

Four other embodiments, also not depicted, can be formed analogously, in that not the ring gear 11, but rather the sun gear 9 is connected to the frame 6 in a rotationally fixed manner, and the pin 1 and shoulder 2 are coupled with the ring gear 11 and planet carrier 8 or with the planet carrier 8 and ring gear 11, wherein the drive can take place via the planet carrier 8 or the ring gear 11. The invention can thus be realized in at least eight different ways, wherein the inventive effects are obtained in each case.

With a friction stir welding tool according to the invention and a corresponding friction stir welding method, it is easily achieved that a speed of the pin 1 differs from a speed of the shoulder 2. As a result, it is both possible to obtain a particularly good stirring of material of the individual component parts 13 in the region of the pin 1 and also to avoid an impermissibly high heating in the region of the shoulder 2 due to excessive relative speeds between the shoulder 2 and the component parts 13, in order to attain particularly high-quality welds in the friction stir welding method. The use of a planetary transmission 7 in this case ensures a robust and simultaneously constructively simple design.

The invention claimed is:

1. A friction stir welding tool for a machine tool which has a frame and a spindle that can be rotated relative to the frame, wherein the friction stir welding tool comprises a pin and a shoulder, as well as a drive shaft which can be connected to the spindle of the machine tool, in order to set the pin and the shoulder in a rotational motion about a rotation axis via the spindle, wherein the shoulder can be rotated relative to the pin about the rotation axis, wherein a planetary transmission having a ring gear, a planet carrier, and a sun gear is provided, which planetary transmission is connected to the drive shaft, pin, and shoulder, wherein the pin or the shoulder is connected to the planet carrier so that the pin and shoulder can be set in rotation about the rotation axis at different rotational speeds, but in the same rotation direction, by driving the drive shaft by the spindle.

2. The friction stir welding tool according to claim 1, wherein the drive shaft is connected to the planet carrier or the sun gear of the planetary transmission, and wherein the shoulder is connected to the planet carrier and the pin to the sun gear of the planetary transmission, wherein the ring gear of the planetary transmission is connected to a supporting device, via which supporting device the ring gear can be connected to the frame of the machine tool such that it is rotationally fixed about the rotation axis.

3. The friction stir welding tool according to claim 1, wherein the drive shaft is connected to the ring gear or the planet carrier, and wherein the shoulder is connected to the ring gear and the pin to the planet carrier of the planetary transmission, wherein the sun gear of the planetary transmission is connected to a supporting device, via which supporting device the sun gear can be connected to the frame of the machine tool such that it is rotationally fixed about the rotation axis.

4. The friction stir welding tool according to claim 1, wherein numbers of teeth of the ring gear, sun gear, and one or more planet gears are chosen such that a rotational speed of the pin is greater than a rotational speed of the shoulder.

5. The friction stir welding tool according to claim 1, characterized in that a force measuring device is provided between the pin and drive shaft, in order to determine an axial and/or radial force on the pin and/or the shoulder during a friction stir welding operation.

6. A machine tool having a frame and a spindle that can be rotated relative to the frame, wherein a friction stir welding tool is connected to the spindle, wherein the friction stir welding tool is embodied according to claim 1.

7. The machine tool according to claim 6, wherein the ring gear or the sun gear is connected to the frame by a supporting device such that said gear is rotationally fixed about the rotation axis.

8. The machine tool according to claim 6, wherein a force measuring device is provided at the spindle in order to determine a radial and/or axial force acting on the spindle.

9. The machine tool according to claim 6, wherein the frame together with the spindle can be moved by a feed drive along a feed direction relative to a machine table and/or relative to component parts being welded.

10. A friction stir welding method, wherein a friction stir welding tool having a drive shaft, a pin, and a shoulder is set in a rotational motion about a rotation axis using a spindle of a machine tool, wherein a motion of the spindle is transferred to the drive shaft, wherein a drive power supplied via the drive shaft is distributed to the pin and shoulder via a planetary transmission that connects the drive shaft, pin, and shoulder, wherein the pin and shoulder rotate about the rotation axis in the same direction, wherein in particular a friction stir welding tool according to claim 1 is used.

11. The friction stir welding method according to claim 10, wherein the drive shaft is connected to a planet carrier or a sun gear of the planetary transmission, wherein the sun gear of the planetary transmission is connected to the pin and wherein the planet carrier is connected to the shoulder of the friction stir welding tool.

12. The friction stir welding method according to claim 10, wherein the drive shaft is connected to a planet carrier or a ring gear of the planetary transmission, wherein the planet carrier of the planetary transmission is connected to the pin and wherein the ring gear is connected to the shoulder of the friction stir welding tool.

13. The friction stir welding method according to claim 10, wherein a rotational speed of the pin about the rotation axis is higher than a rotational speed of the shoulder about the rotation axis.

14. The friction stir welding method according to claim 10, wherein an axial and/or radial force is measured at the spindle and/or at the friction stir welding tool.

\* \* \* \* \*